United States Patent [19]
Marek

[11] 3,873,905
[45] Mar. 25, 1975

[54] CONTROL CIRCUIT TO PROVIDE SHUNT PATH FOR LEAKAGE CURRENT

[75] Inventor: Albert J. Marek, Dallas, Tex.

[73] Assignee: LTV Aerospace Corporation, Dallas, Tex.

[22] Filed: Mar. 18, 1974

[21] Appl. No.: 452,035

[52] U.S. Cl. .......................... 323/9, 307/92, 317/16, 323/8, 323/25
[51] Int. Cl. .............................................. G05f 1/60
[58] Field of Search .......... 317/10, 16, 18 D; 323/1, 323/8, 9, 25, 21; 307/12 S, 130, 131, 92, 100, 297

[56] References Cited

UNITED STATES PATENTS 3,312,862 4/1967 Currin ................................. 317/10
3,761,799 9/1973 Shuey ................................ 323/9 X
3,775,667 11/1973 Bartos ............................... 323/1 X

*Primary Examiner*—Gerald Goldberg
*Attorney, Agent, or Firm*—Walter J. Jagmin; H. C. Goldwire; James M. Cate

[57] ABSTRACT

A control circuit for a switch circuit having a solid state device such as a transistor, an SCR, or triac used as the switching means connected in series with the load, such switching device having a low impedance in its ON state or condition and a high impedance in its OFF state or condition so that it permits flow of leakage current in its OFF condition, the control circuit providing a shunt path for such leakage current to prevent flow of such leakage current through the load when the switch means is in its OFF condition.

4 Claims, 4 Drawing Figures

CONTROL CIRCUIT TO PROVIDE SHUNT PATH FOR LEAKAGE CURRENT

This invention relates to control circuits and more particularly to control circuits for connecting loads across an input circuit of electric current and preventing the flow of current through the loads during periods of non-operation of the load.

Solid state devices such as transistors, SCRs and triacs are often used as switching devices for connecting loads across an input circuit of electric current. Such devices have switch circuits which provide a low impedance path for flow of current when such devices are in their conductive or ON condition of operation and which provide a high, but not infinite, impedance to the flow of current during their non-operational or OFF condition. As a result, when such switch means are in their OFF state or condition they still permit leakage currents, in the range of 1.0 to 100 milliamperes, to flow through their switch circuits. In many applications such as in pyrotechnic devices wherein such switch means are used to control the flow of electric current to igniting devices for explosive charges, such leakage currents may adversely affect the life and operational characteristics of the igniting devices, prevent proper operation of some circuit or cause malfunctions.

It is therefore desirable that a control circuit be provided for use with such switch means which will prevent the flow of such leakage currents through the load during periods of non-operation of the circuit when the load is not to be energized and the switch means are placed in their non-operational or OFF condition and which will provide a full flow of current through the load during periods of energization of the load when the switch means are placed in their operational or ON condition.

Accordingly, it is an object of this invention to provide a new and improved control circuit for controlling the energization of a load connectible across an input circuit of electric current which prevents flow of current through the load during periods of non-energization of the load.

Still another object of the invention is to provide a control circuit having a switch means providing a switch circuit connected in series with the load which is rendered fully conductive only during periods of desired operation of the load and having means for preventing flow of current through the load during periods of non-operation of the load.

An important object of the invention is to provide a control circuit having a solid state switch means, such as a transistor, SCR or triac having a switch circuit connected in series with a load, which switch circuit has a low impedance when such solid state device is rendered conductive or placed in its ON condition and has a high impedance when such switch means is in its OFF condition.

Another object is to provide a control circuit, of the type described, having a shunt circuit operable when the switch device is in its OFF condition for preventing flow of current to the load when the switch device is in its OFF condition.

Still another object is to provide a control circuit, of the type described, which includes a control device, such as a diode, connected in series between the load and such switch circuit, such control device being rendered conductive only when the voltage thereacross exceeds a predetermined value and the shunt circuit preventing the voltage across the control device from exceeding such predetermined value when the switch circuit is in its OFF condition.

Still another object is to provide a control circuit, of the type described, having means for rendering the shunt circuit operational when the switch device is in its OFF condition and for rendering said shunt circuit inoperable when the switch means is in its ON condition.

Other objects and advantages will be evident from the specification and claims and the accompanying drawings illustrative of the invention.

Figure 1:
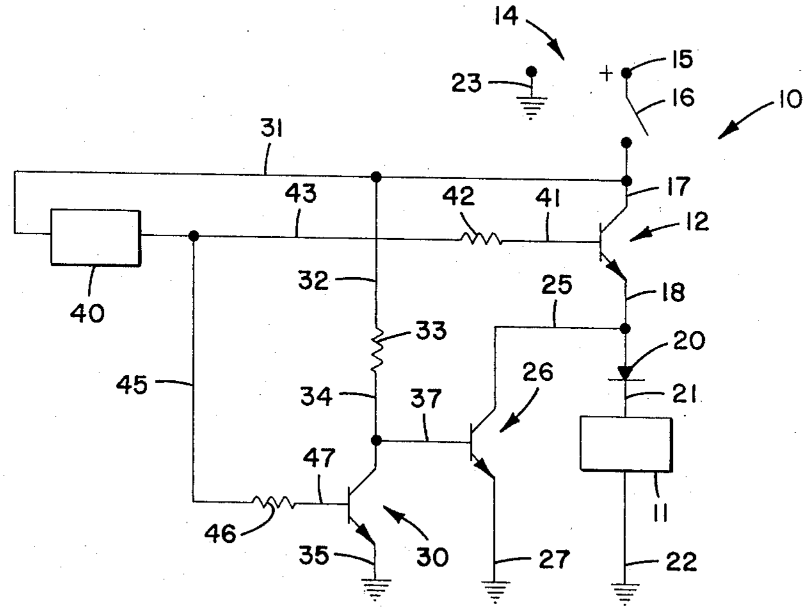
FIG. 1 is a diagrammatical illustration of a control circuit embodying the invention.

Referring now to FIG. 1 of the drawings, the control circuit 10 embodying the invention is used to control the energization of load 11, which may be a low impedance load which requires power for a short period of time as in pyrotechnic devices used to ignite an explosive charge. The control circuit 10 permits flow of current through the load only when a switch transistor 12 is turned ON, i.e., its emitter-collector circuit is rendered fully conductive.

Figure 2:
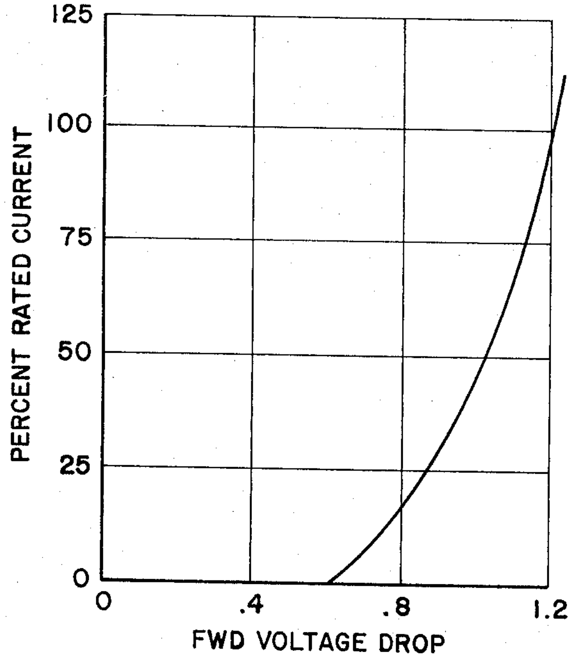
FIG. 2 is a graphic representation of the current to voltage characteristics of a diode used in the circuit embodying the invention.

The emitter-collector circuit of the switch transistor is connected in series with the load across a direct current input circuit 14 through a conductor 15, a switch 16, conductors 17 and 18, a silicon diode 20, the conductors 21 and 22, ground and the conductor 23. As is illustrated in FIG. 2, the diode will conduct current only when the forward voltage thereacross, for a given ambient temperature, exceeds a predetermined value, in the illustrated case, 0.6 volts. Since the emitter-collector circuit of the switch transistor when it is OFF does not present an infinite impedance, it conducts current. As a result a voltage appears across the diode 20 and could increase to above such predetermined value so that it would become conductive and conduct the leakage current to the load even though the transistor is in its OFF condition. A shunt path for such leakage current, to prevent the voltage across the diode from rising to such predetermined value, is provided by a conductor 25, the emitter-collector circuit of a shunt transistor 26, a conductor 27, ground and the conductor 23. The conductor 25 connects the collector of the shunt transistor to the conductor 18 and therefore to the connection of the anode of the diode 20 and the emitter of the switch transistor 12. The shunt transistor is caused to be turned ON whenever the switch transistor 12 is turned OFF by a control transistor 30.

The control transistor has its emitter-collector circuit connected across the input circuit 14 through the conductor 15, the switch 17, the conductors 31 and 32, a resistance 33, conductors 34 and 35, ground and the conductor 23.

It will be apparent that when the control transistor 30 is ON, i.e., its emitter-collector circuit is conductive, the base of the shunt transistor 26 is at substantially ground potential, and the shunt transistor is in its OFF condition.

Conversely, when the control transistor 30 is in its OFF condition, i.e., its emitter-collector circuit is non-conductive, the base of the shunt transistor is at a positive voltage relative to its emitter and, therefore, its emitter-collector circuit is conductive.

The switch transistor 12 and the control transistor 30 are simultaneously turned on whenever the load 11 is to be energized by a suitable control 40 which may be a manually operable switch, a solid state switch, or the like. The base of the switch transistor 12 is connectible to the positive voltage terminal of the input circuit 14 through the conductor 41, a resistance 42, the conductors 43, 31 and 17, the switch 16 and the conductor 15. The control 40 also connects the base of the control transistor 30 to the positive voltage terminal of the input circuit 14, since the conductor 43 is connected to the base of the transistor 30 through the conductor 45, a resistance 46 and a conductor 47.

Assuming now that the switch 16 is closed and that the control 40 now prevents connection of the bases of the switch and control transistors 12 and 30 to the positive voltage terminal of the input circuit 14, the switch and control transistors are OFF since no bias potential is now applied to their bases. The base of the shunt transistor 26, however, is now connected to the positive input terminal through the resistance 33 and since the emitter-collector circuit of the control transistor is now non-conductive, the potential across the base emitter circuit of the shunt transistor 26 renders conductive the emitter-collector circuit of the shunt transistor. The low value leakage current flowing through the emitter-collector of the switch transistor is thus shunted across the diode 20 and the load 11 preventing the voltage across the diode 20 from reaching the threshold voltage value thereof at which the diode is rendered conductive. As a result, the diode 20 prevents any flow of current through the load 11, all of the leakage current flowing through the emitter-collector circuit of the switch transistor 12 being shunted to ground through the emitter-collector circuit of the shunt transistor 26.

When the load 11 is to be energized, the control 40 connects the bases of the switch and control transistors 12 and 30 to the positive voltage terminal of the input circuit through the resistances 42 and 46, respectively, and the emitter-collector circuits of these transistors are rendered conductive. When the emitter-collector circuit of the control transistor 30 is rendered conductive, the potential applied to the base of the shunt transistor 26 drops to substantially ground thus rendering the emitter-collector circuit of the shunt transistor non-conductive. As a result, the voltage across the diode 20 immediately rises above the value at which it is rendered conductive and the full current flowing through the emitter-collector circuit of the switch transistor 12 now flows through the diode 20 and the load 11.

It will thus be seen that the control circuit 10 prevents any flow of current through the load 11 whenever the switch transistor 12 is turned OFF and causes full current to flow through the load when the switch transistor is turned ON.

Figure 3:
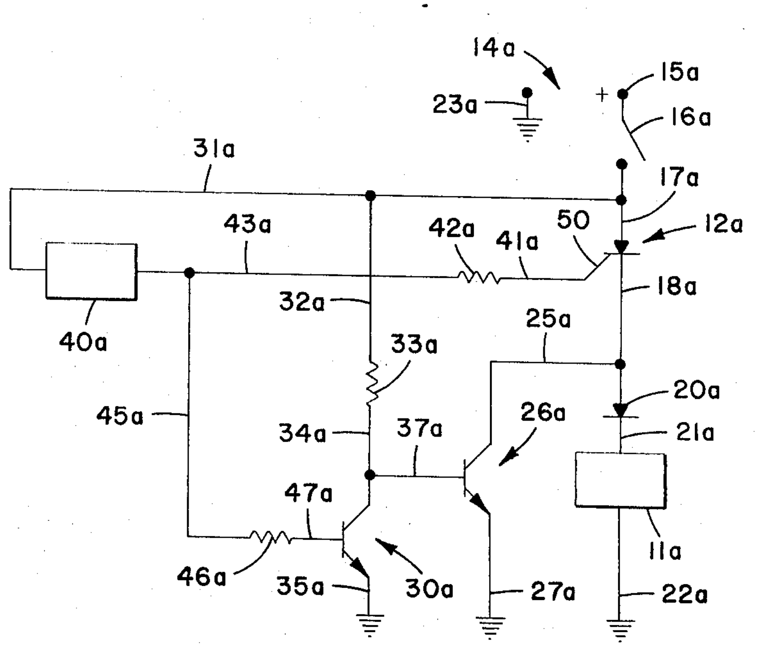
FIG. 3 is a schematic diagram of another control circuit embodyingg the embodying and, FIG. 4 is a schematic diagram of still another form of the control circuit embodying the invention.

The control circuit 10A illustrated in FIG. 3 is similar to the control circuit illustrated in FIG. 1, except that instead of the transistor 12, a silicon controlled rectifier or SCR is employed. Accordingly, all elements of the control circuit 10A have been provided with the same reference numerals, to which the subscript *a* has been added, as the corresponding elements of the control circuit 10.

The control electrode 50 of the SCR 12*a* is connectible by the conductor 41*a*, the resistance 42*a*, the conductor 43*a*, the control 40*a*, the conductors 31*a* and 17*a*, the switch 16*a* and a conductor 15*a* to the positive voltage input terminal of the input circuit 14*a*. The anode of the SCR 12*a* is of course connectible to the positive voltage terminal since it is connected to the conductor 17*a* while its cathode is connected by the conductor 18*a* to the anode of the diode 20*a*.

It will be apparent that the SCR 12*a* will be rendered conductive when the control 40*a* connects its control electrode to the positive voltage terminal of the input circuit, after switch 16*a* has been closed, and that the SCR will then remain conductive until either the switch 16*a* or the load 11*a* and control 40*a* open. The SCR 12*a*, like other solid state switch devices, has a leakage current flowing through its anode-cathode circuit even when it is not turned on, i.e., when no potential is applied across to its control electrode 50 to turn on the SCR 12*a*. Such leakage current is of course shunted across the diode and the load through the shunt transistor 26*a*.

It will be apparent to those skilled in the art that once the SCR 12*a* is rendered conductive, it will remain conductive until either the switch 16*a* is opened or the load 11*a* and control 40*a* open as would be the case if the load were the igniting device in a pyrotechnic device for igniting an explosive charge.

Figure 4:
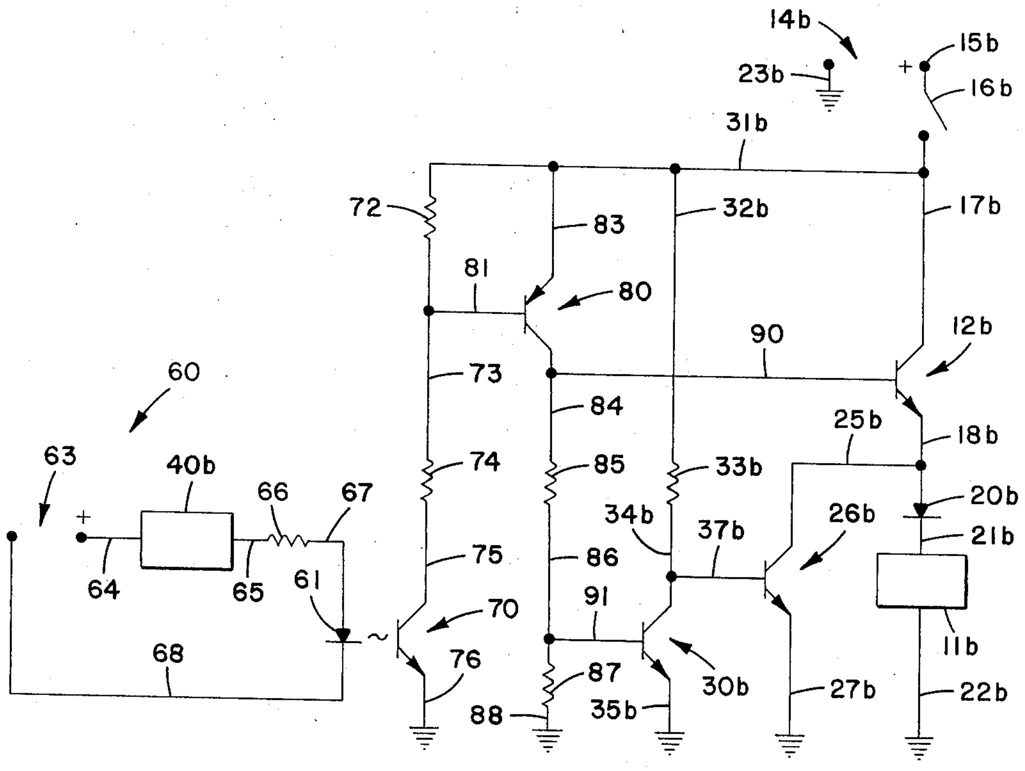

Referring now particularly to FIG. 4, the control circuit 10B illustrated therein is similar to the control circuit 10 and, accordingly, its elements have been provided with the same reference numerals, to which the subscript *b* has been added, as the corresponding elements of the circuit 10.

The circuit 10B differs from the circuit 10 in that the control means of the switch control and shunt transistors 12*b*, 30*b* and 26*b*, respectively, is electrically isolated from the control circuit 40*b* by an isolation circuit 60 which includes a light emitting diode 61 connectible across an input circuit 63 by the control 40*b*, the conductors 64 and 65, a resistance 66 and the conductors 67 and 68. The light emitted by the diode 61, when it is energized, impinges on a light sensitive transistor 70 which is then rendered conductive.

The emitter-collector circuit of the light sensitive transistor 70 is connected across the input circuit 14*b* by the conductor 15*b*, the switch 16*b*, the conductors 17*b* and 31*b*, a resistance 72, a conductor 73, a resistance 74, conductors 75 and 76, ground and the conductor 23*b*.

The base of an amplifier transistor 80 is connected to the conductor 73, and therefore to the common connection of the resistances 72 and 73, by a conductor 81. The emitter-collector circuit of the amplifier transistor 80 is connected across the input circuit 14*b* when the switch 16*b* is closed since its emitter is connected to the conductor 31*b* by a conductor 83 and its collector is connected to ground through the conductor 84, a resistance 85, a conductor 86, a resistance 87 and a conductor 88. The base of the switch transistor 12*b* is connected by a conductor 90 to the conductor 84 and therefore to the common connection of the collector of the amplifier transistor 80 and the resistance 85. The base of the control transistor 30*b* is connected by a conductor 91 to the conductor 86 and therefore to the common connection of the resistances 85 and 87.

In use, assuming now that the switch **16*b* is closed, when the control 40*b* maintains the light emitting diode 61 deenergized so that it is not generating light, the photosensitive transistor 70 is non-conductive. As a result, the amplifier transistor 80 is also OFF since its base is now at substantially the same potential as its emitter. As a result, the switch transistor 12*b* and the control transistor 30*b* are now OFF since their bases are at the same potentials as their emitters. The shunt transistor 26*b* however is ON since its base is at a higher positive potential than its emitter. As a result, the leakage current flowing through the emitter-collector circuit of the switch transistor 12*b* is shunted to ground and the voltage across the diode 20*b*** does not rise to a value at which the diode becomes conductive.

When it is desired to energize the load **11*b*, whether responsive to some predetermined condition or by manual operation, the control 40*b* connects the light emitting diode 61 across the power input circuit 63. The light produced by the diode 61 then of course turns ON the light sensitive transistor 70. When the transistor 70 is rendered conductive, the potential at the base of the amplifier 80 drops relative to the potential at its emitter so that its emitter-collector circuit becomes conductive. When the amplifier transistor 80 becomes conductive, the voltages at the base of the switch transistor 12*b* and at the base of the control transistor 30*b*** become more positive than the voltages at their emitters so that the emitter-collector circuits of these two transistors are immediately rendered conductive.

When the control transistor **30*b* is rendered conductive, the shunt transistor is turned OFF and all of the current flowing through the emitter-collector circuit of the switch transistor also flows through the diode 20*b* and the load 11*b*. The diode 20*b*** of course is rendered conductive when the switch transistor is turned ON and the shunt transistor is turned OFF.

It will now be seen that the control circuit embodying the invention includes a switch means, such as a solid state device 12, which provides a switch circuit, the emitter-collector circuit of the transistor 12 or the anode-cathode circuit of the SCR **12*a*; a control device, diode 20, connected in series with such switch circuit and the load; a shunt means, the transistor 26, for shunting from the load leakage currents flowing through the switch circuit; control means, the control 40, for selectively placing the switch means in its ON and OFF conditions; and means associated with the control means, the control transistor 30**, for rendering the shunt means operative when the switch means is inoperative and vice versa.

While only one embodiment of the invention, together with modifications thereof, has been described in detail herein and shown in the accompanying drawings, it will be evident that various further modifications are possible in the arrangement and construction of its components without departing from the scope of the invention.

What is claimed is:

1. A control circuit including:

switch means providing a switch circuit having a low impedance in a first condition of said switch means and a high impedance in a second condition of said switch means;

a load;

a control device connected in series between said switch circuit and said load, said control device being rendered conductive when the voltage thereacross exceeds a predetermined value;

means for connecting said switch circuit, said control device and said load in series across an electric current input circuit;

shunt means connected between said control device and said switch circuit for shunting from the load currents flowing through said switch circuit when said switch means is in said second condition to prevent the voltage across said control device from exceeding said predetermined value;

control means operatively associated with said switch means for selectively placing said switch means in said first and second conditions; and, means operatively associated with said control means for rendering said shunt means operative when said switch means is in said first condition and for rendering said shunt means inoperable when said switch means is in said second condition.

2. The control circuit of claim 1 wherein said control device is a diode and said switch means comprises a solid state switch device.

3. The control circuit of claim 2, wherein said shunt means comprises a transistor having its emitter-collector circuit connected to the common connection of said diode and said switch circuit for conducting current therefrom and wherein said control means comprises means for rendering said shunt transistor nonconductive when said switch transistor is rendered conductive and for rendering said shunt transistor conductive when said switch transistor is rendered nonconductive.

4. The control circuit of claim 3 and means for electrically isolating said control means from the said other elements of said control circuit.

* * * * *